(12) United States Patent
Kahlman et al.

(10) Patent No.: US 6,418,096 B1
(45) Date of Patent: Jul. 9, 2002

(54) APPARATUS FOR READING AN OPTICAL DATA CARRIER

(75) Inventors: Josephus A. H. M. Kahlman; Willem M. J. Coene, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/371,372

(22) Filed: Aug. 10, 1999

(30) Foreign Application Priority Data

Aug. 10, 1998 (NL) ............................................ 1009829

(51) Int. Cl.⁷ .............................................. G11B 7/095
(52) U.S. Cl. ............................... 369/44.32; 369/53.19; 369/53.12
(58) Field of Search ........................... 369/44.27, 44.28, 369/44.29, 44.32, 44.34, 44.41, 47.1, 53.1, 53.19, 53.11, 53.12, 53.13, 53.14, 53.15, 53.18, 53.2, 53.28

(56) References Cited

U.S. PATENT DOCUMENTS 5,703,855 A   12/1997  Kirino et al. .................. 369/54
6,041,030 A * 3/2000  Ohmi ................... 369/44.32 X
6,137,754 A * 10/2000 Furukawa et al. ....... 369/44.32

FOREIGN PATENT DOCUMENTS

| EP | 0397354 A2 | 11/1990 |
| EP | 0569597 A1 | 11/1993 |
| EP | 0583818 A1 | 2/1994 |
| EP | 0662685 A1 | 7/1995 |
| JP | 1031824 A | 2/1998 |

\* cited by examiner

*Primary Examiner*—Muhammad Edun

(57) ABSTRACT

An apparatus for reading an optical data carrier (1) in accordance with the invention, comprises a transducer (5) for optically reading an optically readable pattern recorded in substantially parallel data tracks of the data carrier (1). The transducer (5) generates a read signal ($S_0(t)$) which is an indication of the optically readable pattern. The apparatus further includes unit for realizing a relative movement of the transducer (5) with respect to the data carrier (1). The apparatus also has correction unit (16, 17, 18) for reducing tangential tilt ($I_T$) and error, signal generating unit (20) for generating an error signal ($S_E(t)$) for the correction unit. The apparatus characterized in that the error signal generating unit (20) are adapted to derive the error signal ($S_E(t)$) from a temporal asymmetry of the response of the read signal ($S_0(t)$) to the optically readable pattern.

14 Claims, 8 Drawing Sheets

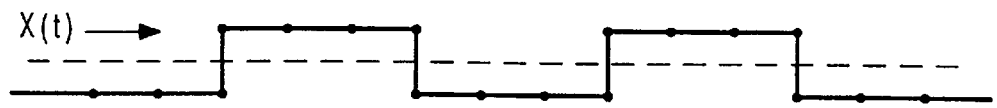
FIG. 4A
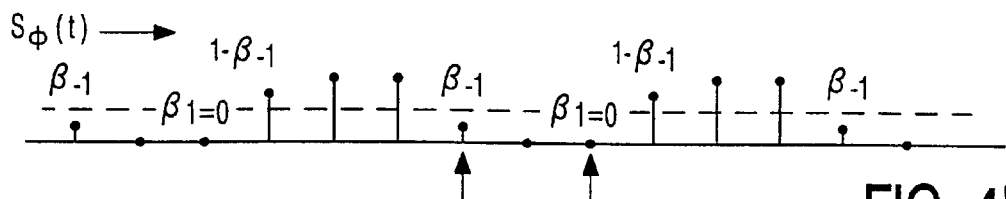
FIG. 4B
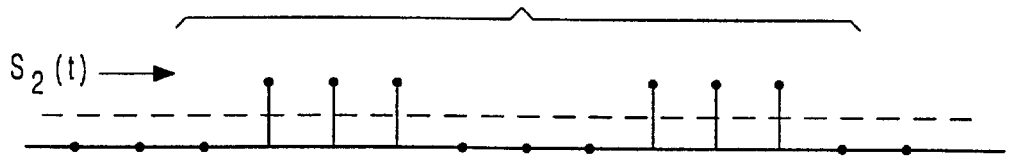
FIG. 4C
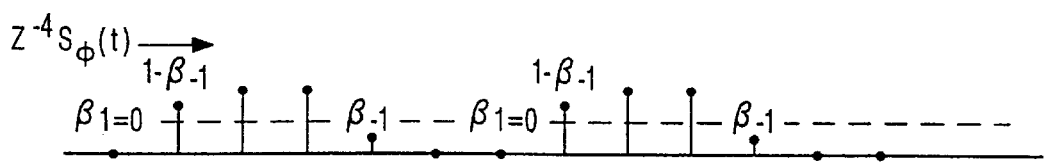
FIG. 4D
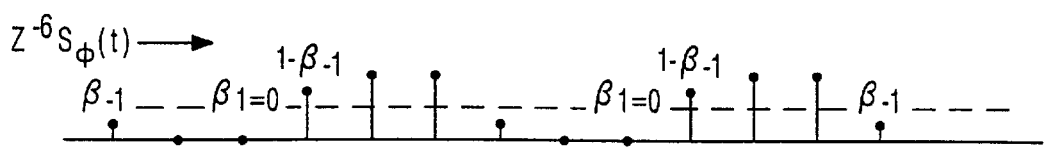
FIG. 4E
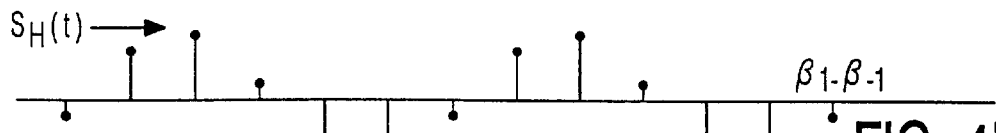
FIG. 4F
FIG. 4G
FIG. 4H
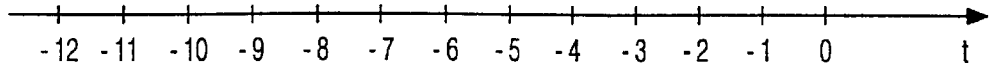

FIG. 6A
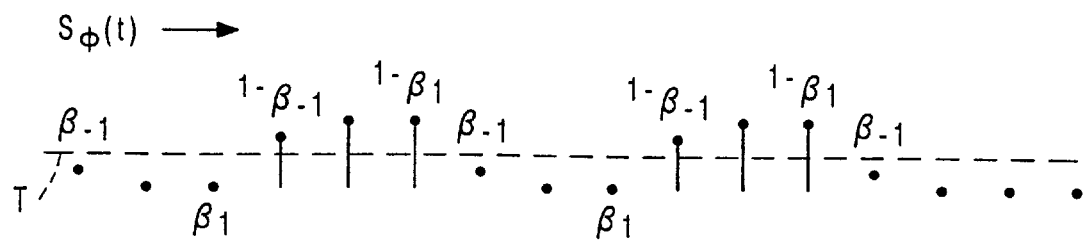
FIG. 6B
FIG. 6C
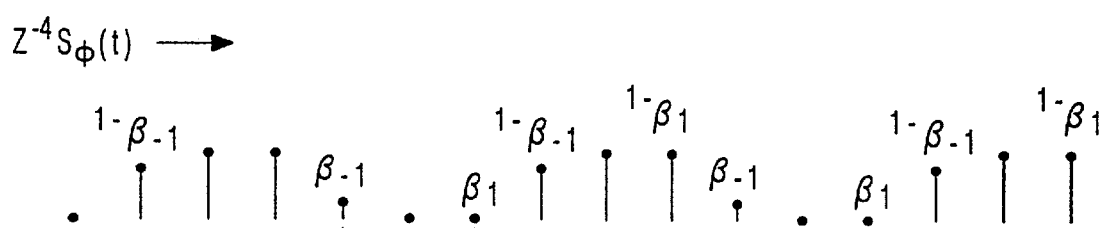
FIG. 6D
FIG. 6E
FIG. 6F
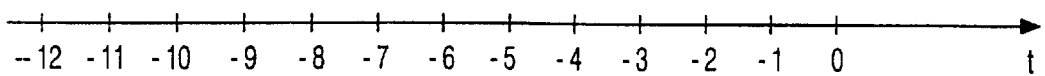

APPARATUS FOR READING AN OPTICAL DATA CARRIER

BACKGROUND OF THE INVENTION

The invention relates to apparatus for reading an optical data carrier having an optically readable pattern in substantially parallel data tracks, and more particularly to such an apparatus having a relatively movable transducer for generating a read signal, and an error signal generator providing an error signal to a correction device for reducing tangential tilt of the transducer. The invention also relates to a method of reducing tangential tilt in such an apparatus.

During reading of an optical data carrier the transducer generates a radiation beam for scanning optically readable patterns on the data carrier. As the density with which data is recorded on an optical data carrier increases the tolerance for deviations (tilt) of the angle of incidence from the perpendicular angle diminishes. The tilt can have a radial component and a tangential component. The tangential component (tangential tilt) is defined as the component of the deviation in a plane oriented parallel to the track to be read and transversely to the data carrier. The radial component (radial tilt) is the component of the deviation in a plane oriented transversely to the track to be read and transversely to the data carrier.

An apparatus of the type defined in the opening paragraph is known from EP 569 597 A1. In the known apparatus the transducer comprises a transparent plate arranged in an optical path from a radiation source to the data carrier. The orientation of the transparent plate depends on an error signal which is a measure of the radial and/or tangential tilt of the data carrier. For this purpose, in a first embodiment, a sub-beam is split off the beam which is reflected from the data carrier. The sub-beam is imaged onto a four-quadrant detector via a screen which blocks a central portion of the beam. The error signal is derived from differences between four signals generated by means of the detector. In another embodiment the apparatus is equipped with auxiliary means for determining the orientation of the transparent plate and auxiliary means for determining the orientation of the data carrier. Both auxiliary means comprise a separate radiation source and a detector for generating four signals. In this embodiment the error signal is derived from the two sets of four signals.

SUMMARY OF THE INVENTION

It is an object of the invention to provide an apparatus of the type defined in the opening part, which requires less additional optical means for generating the error signal for the purpose of tangential tilt correction.

To this end, according to the invention, the error signal generator derives the tangential tilt error signal from a temporal asymmetry of the response of the read signal to the optically readable pattern. The invention enables the error signal for the correction means to be derived from the read signal which is already generated for reproducing the data from the data carrier. As a result of this, the apparatus in accordance with the invention does not require any additional optical means.

It is to be noted that from EP 583 818 A1 a device is known for detecting distortions in a signal and correcting the distortions by means of a variable equalizer. However, said document does not describe the relationship between tangential tilt of a transducer with respect to a data carrier and the properties of the read signal. Neither is it apparent from said document how an error signal is to be generated for correction means for reducing the tangential tilt.

The apparatus in accordance with the invention is based on the following insight. In the case of a perpendicular angle of incidence of the radiation beam generated by the transducer the read signal accurately corresponds to the optically readable pattern recorded on the data carrier. For an angle of incidence which deviates from the perpendicular orientation in a tangential direction the radiation beam is imaged on the data carrier as an asymmetrical light spot. The asymmetry of the light spot gives rise to a temporal asymmetry in the response of the read signal to the optically readable pattern. The response of the read signal $S_0(t)$ to the optical pattern can be defined as $$S_0(t) = \tau . \Sigma\{i=-M, i=M\} \beta_i . x(t-i),$$

where $x(\ )$ is the signal recorded on the data carrier, $\tau$ is a gain factor and $\beta_i$ are coefficients and $\beta_0 = 1$.
The following approximation applies:

$$S_0(t) = \tau(\beta_{-1} . x(t-1) + (1-\beta_{-1}-\beta_1) . x(t) + \beta_1 . x(t+1)),$$

For a limited tilt angle, for example of the order of 0 tot 1° the difference between the coefficients $\beta_{-1}$ and $\beta_1$ is substantially proportional to the value of the tilt angle. Since in the apparatus in accordance with the invention the magnitude of the tangential tilt is reduced it is also possible for the bit detection means to derive from the read signal $S_0(t)$ a signal $S_2(t)$ which is a reliable estimate (represented by [ ]) of the signal $x(t)$ recorded on the data carrier.

$$S_2(t) = [S_0] . x(t).$$

Given the fact that the signal recorded on the data carrier can be estimated in a reliable manner it is possible at instants at which a step appears in the recorded signal to derive an error signal indicative of the direction and magnitude of the tilt from the signal which is distorted by tangential tilt. The calculation of the error signal $S_E(t)$ is simplest for those instants t which comply with $(S_2(t-1), S_2(t), S_2(t+1)) = (0,0,1)$ or $(1,0,0)$. For these two situations the instantaneous values of the read signal successively comply with:

$$S_0' = \tau . \beta_1,$$

and $$S_0'' = \tau . \beta_{-1}.$$

The difference between $S_0'$ and $S_0''$ forms a suitable error signal for tangential tilt correction.

However, it is also possible to derive an estimate for the error signal from the read signal at instants which comply with $(S_2(t-1), S_2(t), S_2(t+1)) = (0,1,1)$ or $(1,1,0)$. For these two situations the instantaneous values of the read signal successively comply with:

$$S_0' = \tau(1 - \beta_{-1}),$$

and $$S_0'' = \tau(1 - \beta_1).$$

Again, the difference between $S_0'$ and $S_0''$ forms a suitable error signal.

In another embodiment of the apparatus in accordance with the invention the error signal is calculated from a sequence of values of the read signal in the proximity of a step. This has the advantage that variations in the error signal as a result of fluctuations in the step response are reduced.

In a practical embodiment of the apparatus in accordance with the invention, the error signal generator includes an auxiliary signal generator having delay circuits for producing a multivalent signal from the read signal, a sample and hold circuit for storing a sampled value of the auxiliary signal, and a circuit for generating a control signal for the sample and hold circuit when a step in the read signal is signalled.

In a preferred embodiment the error signal generating means calculates the error signal again for every step in the read signal, as a result of which a rapid correction of the tangential tilt is achieved. One circuit signals a negative step, and another circuit, independently, signals a positive step.

The apparatus may also include channel decoding means, for example decoding means for an FLL code, for example EFM. Error detection means can be based on, for example, a Reed-Solomon code, for example the Cross-interleaved Reed-Solomon code. The use of error detection means enables errors in the estimated value $S_2(t)$ of the signal $(x)t$ recorded on the data carrier to be corrected. This makes it possible to extend the range of the angle within which tangential tilt can be corrected.

On the one hand, the highest accuracy of the error signal is achieved if the detected step forms part of a regular pattern having a length of a few periods. However, such patterns occur relatively infrequently in the read signal. On the other hand, shorter pattern s are more frequent. Consequently, the detection of such patterns allows a more frequent adaptation of the error signal. An attractive compromise for RLL coded data is provided when a negative step in the read signal is signalled upon the occurrence of a bit sequence which successively comprises one bit of the value 0, n bits of the value 1, n bits of the value 0 and one bit of the value 1; and a positive step in the read signal upon the occurrence of a bit sequence which successively comprises one bit of the value 1, n bits of the value 0, n bits of the value 1 and one bit of the value 0. In an embodiment favorable in the case that the signal recorded on the data carrier is modulated with the EFM channel code, n=3.

Correction of tangential tilt makes it possible to increase the data density in the direction of the tracks to be read. The embodiment in which a further circuit generates a further error signal which is a measure of radial tilt allows the data density to be increased also in a direction perpendicular thereto. One embodiment uses means for the generation of the further error signal described in the Application filed simultaneously with the present Application and listed in the Cross-Reference to Related Applications. Said Application is therefore incorporated in the present Application by reference.

The invention also relates to an apparatus for reading from and writing on an optically readable data carrier. The transducer for reading and the transducer for writing can utilize common means, for example a common radiation source and/or common optical means.

In the case of preformatted data carriers an apparatus in accordance with the invention can utilize information specified in headers of the data carrier for writing on an optical data carrier. Such an apparatus in accordance with the invention can, for example, alternately write information onto the data carrier and read information, such as address information, from the headers. During reading the apparatus can generate an error signal in a manner corresponding to that in an apparatus in accordance with the invention intended exclusively for reading a data carrier.

BRIEF DESCRIPTION OF THE DRAWING

These and other aspects of the invention will be described in more detail with reference to the drawings. In the drawings:

FIG. 4 shows some signals generated in the error signal generating means shown in FIG. 3, FIG. 6 shows some signals in the error signal generating means shown in FIG. 5.

DESCRIPTION OF THE PREFERRED EMBODIMENTS

Figure 1:
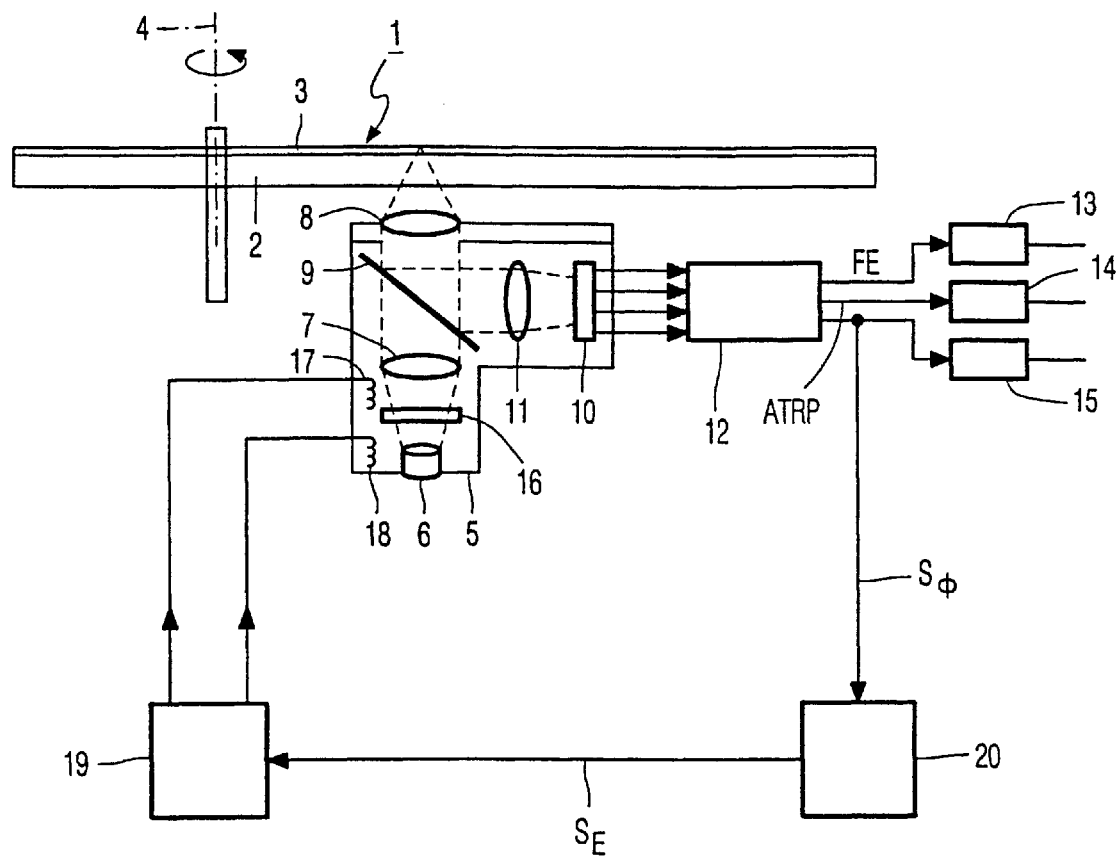
FIG. 1 diagrammatically shows an apparatus in accordance with the invention, FIG. 2 diagrammatically represents tangential tilt.

FIG. 1 shows a first embodiment of an apparatus for reading from and/or writing on an optical data carrier 1. The data carrier 1 in the present case is of a (re)writable type. For this purpose, the data carrier has a radiation-sensitive layer 3 deposited on a transparent substrate 2. In or on the radiation-sensitive layer, for example, a radiation-sensitive dye layer or a so-called phase change layer, an optically readable pattern can be formed. Conversely, the data carrier 1 can be of the read-only type, the optically readable pattern being obtained, for example by pressing with the aid of a die.

The apparatus of FIG. 1 comprises a transducer 5 for optically reading an optically readable pattern recorded in substantially parallel data tracks of the data carrier 1, and for generating a read signal $S_0(t)$ which is indicative of the optically readable pattern. The transducer 5 comprises a radiation source 6, in the form of, for example, a solid-state laser and optical means including a lens 7, a beam splitter 9, a focusing element 8 and an astigmatic element 11. The optical means guide a radiation beam from the radiation source 6 to the sensor 10 via the data carrier 1. The sensor has four quadrants (not shown) which each generate a sensor signal. A preprocessor 12 generates a read signal $S_0(t)$ on the basis of the four sensor signals. The read signal $S_0(t)$ in the present case is the average of the four sensor signals. Apart from the read signal $S_0(t)$ the preprocessor 12 derives a focus error signal FE from the four sensor signals. The focus error signal is applied to a control circuit 13 which minimizes the focus error in a customary manner. The preprocessor 12 further generates a radial push-pull signal ATRP, which is applied to an FM demodulator 14.

The apparatus further includes means (not shown) for rotating the data carrier 1 about an axis of rotation 4 and for moving the transducer 5 at least substantially perpendicularly to the axis of rotation 4. Said means form means for realizing a relative movement of the transducer 5 with respect to the data carrier 1.

Figure 2:
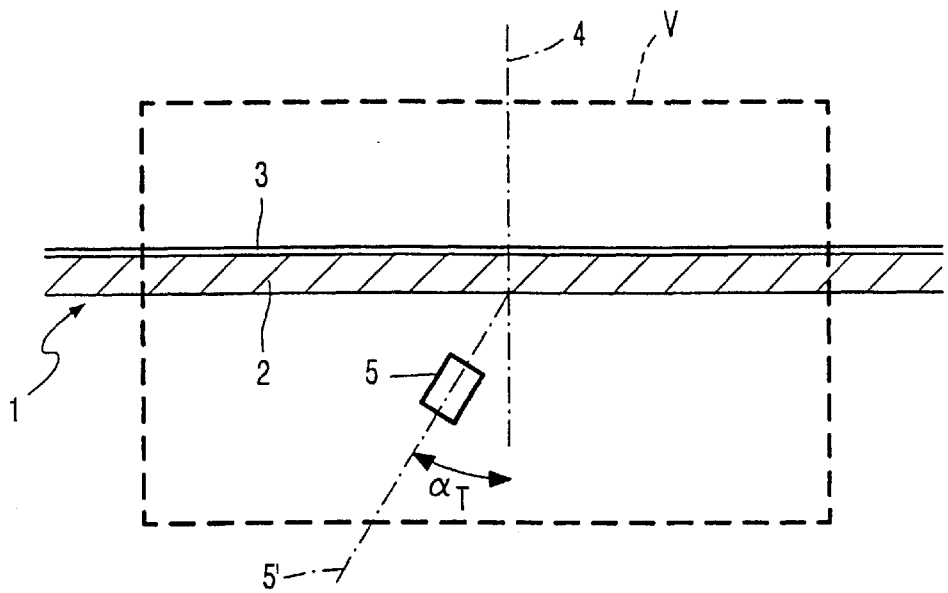

FIG. 2 shows diagrammatically a condition of tangential tilt $I_T$. The angle $I_T$ is shown here to a highly exaggerated scale. In reality a tilt angle of the order of 1° can already impair the process of reading and/or writing of a data carrier. The tangential component "$_T$ is defined as the component of the deviation in a plane V oriented parallel to the track to be read and transversely to the data carrier 1.

The apparatus includes correction means 16, 17, 18 for reducing tangential tilt. The correction means 16 in the present case comprise a transparent plate which also forms part of the optical means. The orientation of the transparent plate 16 can be controlled by means of actuators 17, 18. The actuators 17, 18 are controlled by a driver 19 in response to an error signal $S_E(t)$. Another embodiment does not employ a transparent plate as mentioned above and has correction means comprising actuators for controlling the orientation of the entire transducer 5. The apparatus further comprises error signal generating means 20 for the generation of the error signal $S_E(t)$ for the correction means 16–18. The apparatus in accordance with the invention is characterized in that the error signal generating means 20 are adapted to derive the error signal $S_E(t)$ from a temporal asymmetry of the response of the read signal $S_0(t)$ to the optically readable pattern.

Figure 3:
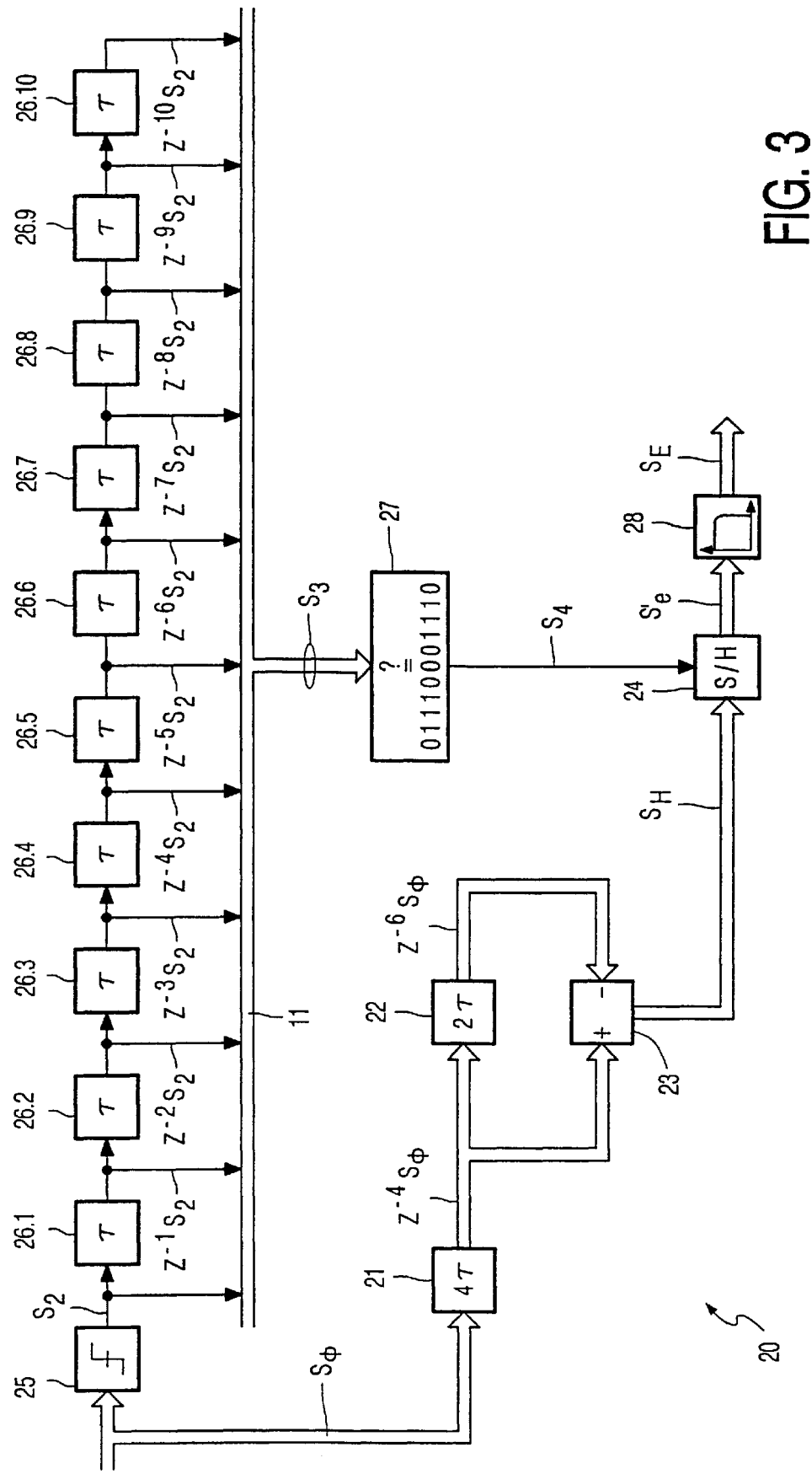
FIG. 3 shows in more detail the error signal generating means of the apparatus of FIG. 1.

FIG. 3 shows in more detail the error signal generating means 20. The error signal generating means 20 comprise auxiliary signal generating means 21, 22, 23 for generating a multivalent auxiliary signal $S_H(t)$ from the read signal $S_0(t)$. Herein, multivalent is to be understood to mean having more than two values. The auxiliary signal generating means include first delay means 21. These means derive a first additional multivalent signal $z^{-4}S_0(t)$ from the input signal $S_0(t)$ by delaying it by four clock periods. Second delay means 22 derive from the first additional multivalent signal $z^{-4}S_0(t)$ a second additional multivalent signal $z^{-6}S_0(t)$ which is delayed by six clock periods with respect to the input signal $S_0(t)$. The auxiliary signal generating means further include signal combining means 23 which derive the multivalent auxiliary signal $S_H(t)$ from the first and the second additional multivalent signal. The error signal generating means further include sample and hold means 24 for sampling a value of the multivalent auxiliary signal $S_H(t)$ and storing the sampled value.

The error signal generating means further include signalling means 25, 26.1–26.10 and 27. The signalling means have a bit detector 25. The bit detector 25 in the present case is a level detector which derives from the multivalent read signal $S_0(t)$ a binary signal $S_2(t)$ by comparing the read signal $S_0(t)$ with a reference level. In another embodiment the bit detector is, for example, a detector of the PRML type (partial response maximum likelihood) or of the FRML type (full response maximum likelihood). The reference level can be set adaptively, for example by determining an average value of the multivalent read signal $S_0(t)$. The binary signal is applied to a delay line 26.1–26.10 having 10 delay elements which each produce a delay by 1 clock cycle. The signal $S_2(t)$ applied to the delay line and signals $z^{-1}S_2(t)$ –$Z^{-10}S_2(t)$ supplied by the delay elements together form an eleven-fold signal $S_3(t)$. A comparator 27 compares this eleven-fold signal $S_3(t)$ with the binary pattern 01110001110. When this binary pattern is detected in the eleven-fold signal $S_3(t)$ the comparator 27 generates a control signal $S_4(t)$ for the sample and hold means 24. The signal S2 causes the sample and hold means to sample and hold the value of the auxiliary signal $S_H(t)$. In response to the signal $S_E'(t)$ supplied by the sample and hold means 24 the low-pass filter 28 supplies an error signal $S_E(t)$ to the driver 19 of the correction means 16–18. A low-pass filter is not necessary in all cases. The error signal can also be supplied directly by the sample and hold means 24. The correction means 16–18 are for example so slow that they respond only to low-frequency components in the error signal.

The operation of the embodiment shown in FIGS. 1 and 3 is explained with reference to FIG. 4. FIG. 4A diagrammatically shows a signal x(t) recorded on a data carrier. FIG. 4B shows the read signal $S_0(t)$ generated by the transducer in a situation in which the angle of incidence has a deviation in a direction opposite to the direction in which the relevant track of the data carrier is read. Therefore, the read signal $S_0(t)=\tau(\beta_{31\ 1}.x(t-1)+(1-\beta_{31\ 1}).x(t))$. By way of example it is assumed that the gain $\tau$ in the present case is 1. The value of $\beta_{31\ 1}$ is 0.25 in the present case. FIG. 4C shows the signal $S_2(t)$ obtained by level detection from the signal $S_0(t)$. This signal is an estimate for x(t). At the instant t=0 the sequence of signal values $S_2(-10), \ldots S_2(0)$ corresponds to the binary pattern 01110001110 and the signalling means generate the control signal $S_4(t)$ shown in FIG. 4G. In the example shown the sequences of signal values $S_2(-16), \ldots, S_2(-6)$ and $S_2(-22), \ldots, S_2(-12)$ also correspond to the said binary pattern as a result of which a control signal $S_4(t)$ is also generated at the instants t=–6 and t=–12. FIGS. 4D and 4E successively show the read signal $S_0(t)$ delayed by four and by six clock cycles. FIG. 4F shows the signal $S_H(t)$ which represents the difference between the signals shown in FIG. 4D and FIG. 4E. The signal shown in FIG. 4H is derived from this difference signal $S_H(t)$ by the sample and hold means 24. This signal is a measure of the tangential tilt.

Figure 5:
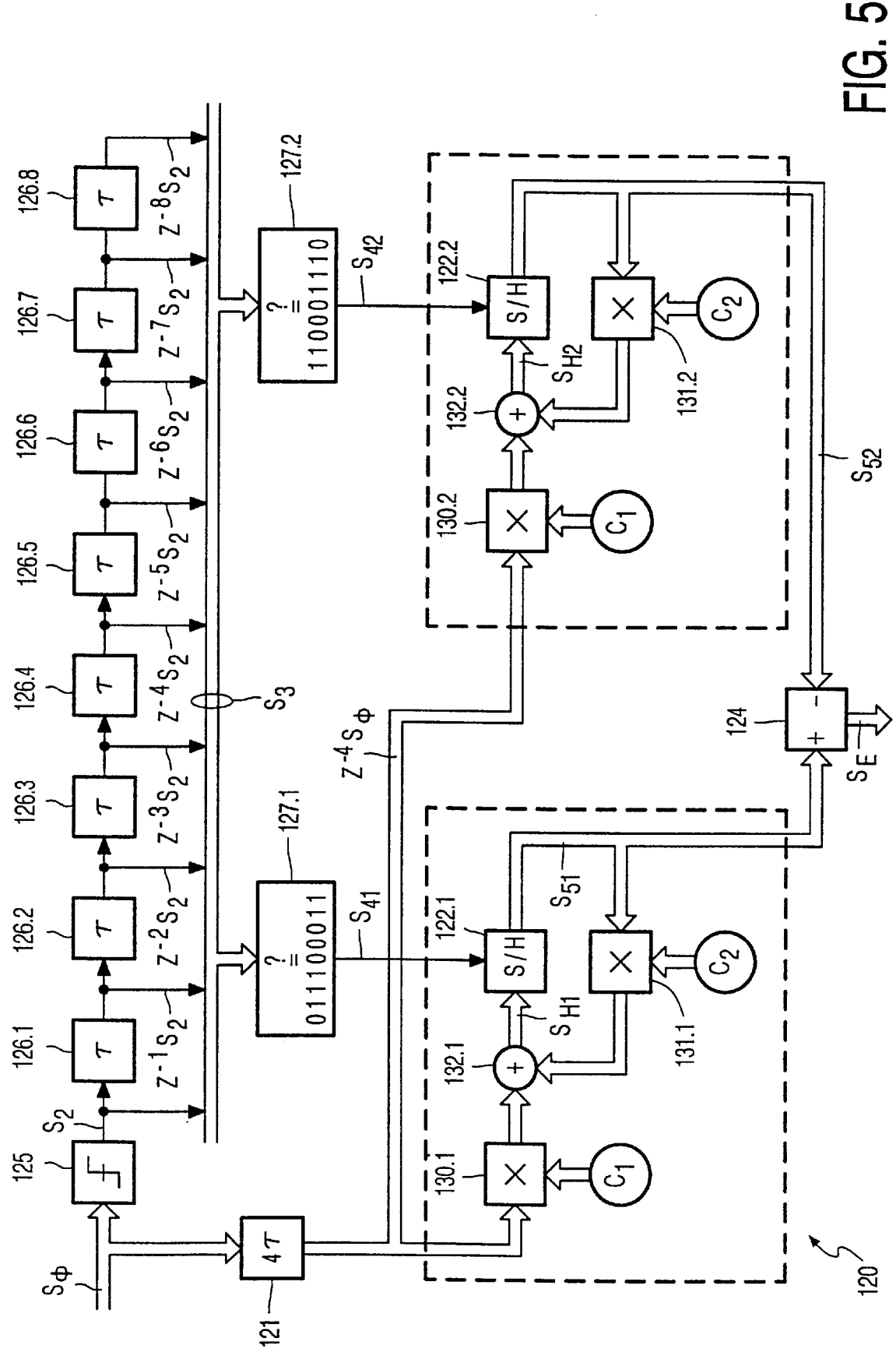
FIG. 5 shows the error signal generating means in a second embodiment of the apparatus in accordance with the invention.

FIG. 5 shows the error signal generating means in a second embodiment of the apparatus in accordance with the invention. Parts therein which correspond to those in FIG. 3 bear the same reference numerals incremented by 100. In this embodiment the signalling means include first signalling means 127.1 for signalling a negative step in the read signal $S_0(t)$ and second signalling means 127.2 for signalling a positive step in the read signal $S_0(t)$. The first signalling means 127.1 generate a first control signal $S_{41}(t)$. The first control signal has a value "1" for a negative step in the read signal $S_0(t)$, i.e. when the bit sequence with the binary pattern 011100011 appears in the detected signal $S_2(t)$. In other situations the control signal $S_{41}(t)$ has the value "0". The second signalling means 127.2 generate a second control signal $S_{42}(t)$. This control signal has a value "1" when a positive step in the read signal $S_0(t)$ is detected, i.e. when the bit sequence with the binary pattern 110001110 occurs in the detected signal $S_2(t)$. In other situations the value of the second control signal $S_{42}(t)$ is "0".

The auxiliary signal generating means in the present case include a delay unit 121 which delays the multivalent input signal $S_0(t)$ by four clock cycles. The auxiliary signal generating means further include a first multiplier 130.1 for multiplying the delayed multivalent signal by a factor c1, a second multiplier 131.1 for multiplying a first additional signal $S_{51}(t)$ by a factor c2 and a first adder 132.1 for calculating the auxiliary signal $S_{H1}(t)$ from the two multiplied signals.

The auxiliary signal generating means further include a third multiplier 130.2 for multiplying the delayed read signal by a factor c1 and a fourth multiplier 131.2 for multiplying a second additional signal $S_{52}(t)$ by a factor c2. A second adder 132.2 calculates a further auxiliary signal $S_{H2}(t)$ from the signals obtained by means of the third and the fourth multiplier 130.2 and 131.2.

The error signal generating means include first sample and hold means 122.1. The first sample and hold means 122.1 sample a value of the multivalent auxiliary signal $S_{H1}(t)$ and store the sampled value when the first signalling means 127.1 detect a negative step. The sample and hold means 122.1 supply the first additional signal $S_{51}(t)$.

The error signal generating means further include second sample and hold means 122.2. These means sample a value of the further auxiliary signal $S_{H2}(t)$ and store the sampled value when the second signalling means 127.2 signal a positive step. The second sample and hold means 122.2 supply the second additional signal $S_{52}(t)$. Signal combination means 124 calculate the error signal from the first and the second additional signal $S_{51}(t), S_{52}(t)$. In the present case the signal combination means are adapted to calculate the difference between the first and the second additional signal $S_{51}(t)$ and $S_{52}(t)$.

The embodiment shown in FIG. 5 is elucidated with reference to FIG. 6. FIG. 6A shows the in signal x(t) recorded in the data carrier. FIG. 6B shows the read signal $S_0(t)$ afflicted with tangential tilt. Level detection with a detection level T yields the binary signal $S_2(t)$ shown in FIG. 6C. The delay means 121 generate the delayed read signal $z^{-4}S_0(t)$, shown in FIG. 6D, from the read signal $S_0(t)$. FIG. 6E and FIG. 6F successively show the first and the second control signal $S_{41}(t), S_{42}(t)$. It is apparent from FIGS. 6D and 6E that for a value "1" of the first control signal the value of the delayed read signal $z^{-4}S_0(t)$ corresponds to the factor $\beta_1$. From FIGS. 6D and 6F it also appears that for a value "1" of the second control signal the value of the delayed read signal $z^{-4}S_0(t)$ corresponds to the factor $\beta_{-1}$. The values of the read signal $S_0(t)$ thus selected consequently provide a good indication of the degree of tangential tilt.

Figure 7:
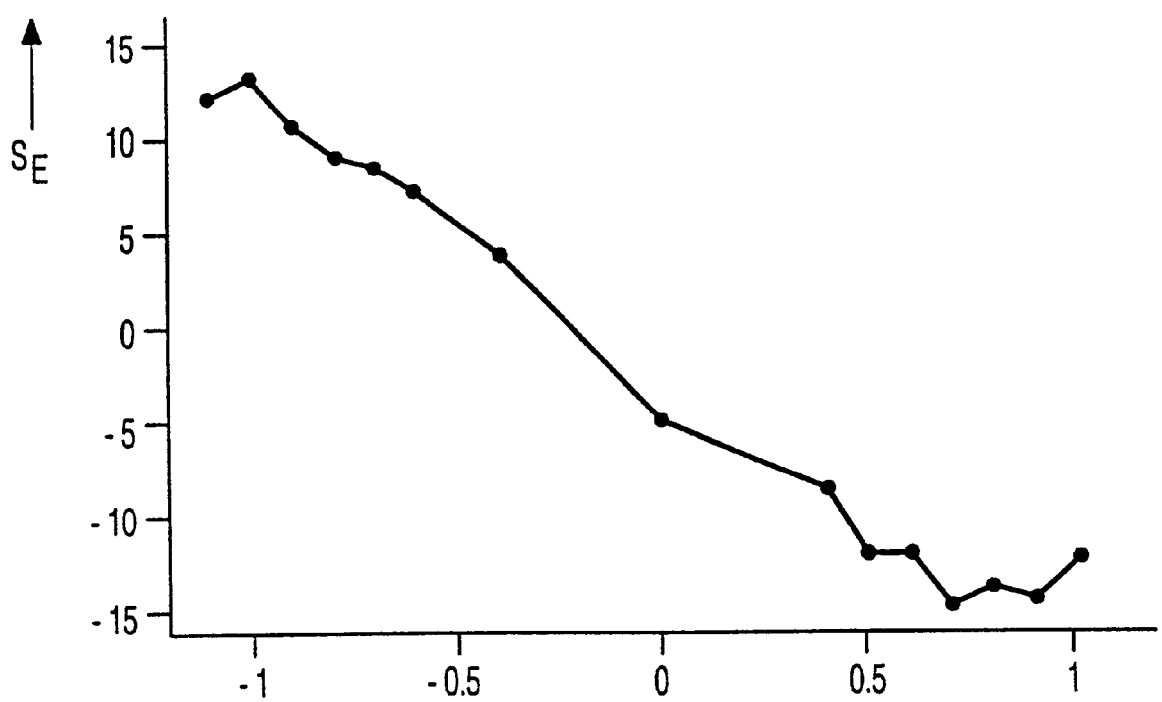
FIG. 7 shows the error signal SE(t) as a function of the tangential tilt angle "$_T$.

In a test the tangential tilt angle $"_T$ is varied between −1.1 and 1.0 degrees. FIG. 7 shows the error signal $S_E(t)$ as a function of the tilt angle $I_T$. From this Figure it is apparent that the error signal $S_E(t)$ is a monotonically decreasing function of the tilt angle $"_T$ over a range of −1.0 tot 0.7 degrees and is consequently suitable as a control signal for correction means. It is to be noted that the optical system of the apparatus used for the test exhibited a small degree of asymmetry. As a result of this, the error signal $S_E(t)$ differs from 0 for a tilt angle $"_T$. An attractive effect of the measure in accordance with the invention is that the correction means reduce the tilt angle $"_T$ to a value at which the resultant asymmetry in the read signal is eliminated. This means that the tangential tilt angle is reduced to a value which compensates for the asymmetry of the optical system.

Figure 8:
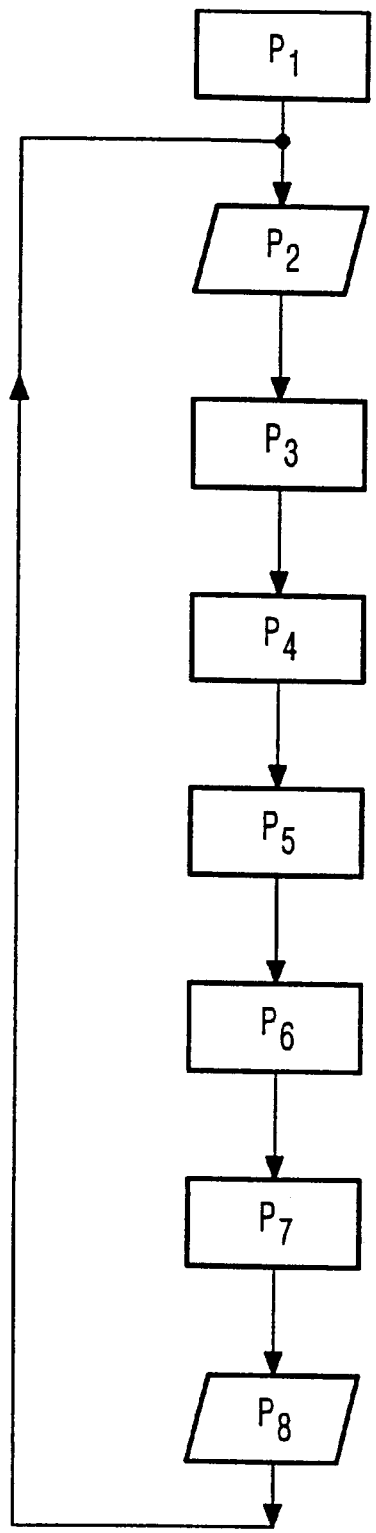
FIG. 8 represents a program for calculating an error signal $S_E(t)$ in a third embodiment of the apparatus in accordance with the invention.

It is not necessary to calculate the error signal by means of dedicated hardware. In a third embodiment this hardware is replaced by a suitably programmed general purpose microprocessor. An example of a program is elucidated with reference to FIG. 8.

In the first program part P1 a number of variables and arrays is initialized as follows.

| | |
|---|---|
| binary pattern1[9] | = {0, 1, 1, 1, 0, 0, 0, 1, 1} |
| binary pattern2[9] | = {1, 1, 0, 0, 0, 1, 1, 1, 0} |
| binary S3[9] | = {0, 0, 0, 0, 0, 0, 0, 0, 0} |
| integer S0DEL[5] | = {0, 0, 0, 0, 0} |
| integer S51 | = 0 |
| integer S52 | = 0 |

S3 corresponds to the signal $S_3(t)$ of FIG. 5, in which S3[0] is the instantaneous value of S2 and S3 [n] (n=1, . . . , 8) is the value of $z^{31}$ $"S_2(t)$.
Pattern 1 and pattern 2 successively correspond to the bit sequences with which the signal $S_3(t)$ is compared by signalling means 127.1 and 127.2.
S0DEL represents the last 5 values of the read signal $S_0$, where S0DEL[0] corresponds to the signal $S_0(t)$ and S0DEL [4] corresponds to the instantaneous value of the signal $z^{-4}S_0(t)$. S51 and S52 correspond to the instantaneous values of the signals $S_{51}(t)$ and $S_{52}(t)$ in FIG. 5.

In the second program part P2 the instantaneous value of $S_0(t)$, i.e. S0, is read in.

In the third program part P3 the array S3[ ] is again calculated as follows.
For J=7 to 0, step −1
    S3[J+1]=S3[J]
EndFor
S3[0]=threshold (S0)
Herein, the function thresholds( ) carries out a level detection, the function value being 0 if the value S0 is below a detection level and 1 if the value S0 is above the detection level. The detection level corresponds, for example, to a running average of the signal $S_0(t)$.

In the fourth program part P4 the array S0DEL is calculated again. The calculation proceeds as follows:
For J=3 to 0, step −1
    S0DEL[J+1]=S0DEL[J]
EndFor
S0DEL[ ]=S0

In the fifth program part P5 the first additional signal S51 is adapted if the contents of the array S3[ ] and the first binary pattern pattern1[ ] correspond.
If S3[ ]=pattern1[ ] then
    S51=C*S0DEL[4]+(1−C)*S51
EndIf Subsequently, in the sixth program part P6 the second additional signal S52 is adapted if the contents of the array S3 ( ) and the second binary pattern pattern2[ ] correspond to one another.

The rate at which the variables S51 and S52 are adapted depends on the choice of the parameter C. A suitable value of the parameter C is for example of the order of 0.001 to 0.02.
If S3[ ]=pattern2[ ] then
    S52=C*S0DEL[4]+(1−C)*S52
EndIf In the seventh program part P7 the error signal SE is calculated in accordance with:
    SE=S51−S52
In the eighth program part P8 the error signal is applied to an output of the microprocessor.

The series of program parts P2 to P8 is repeated until reproduction of the data on the data carrier is stopped.

Figure 9:
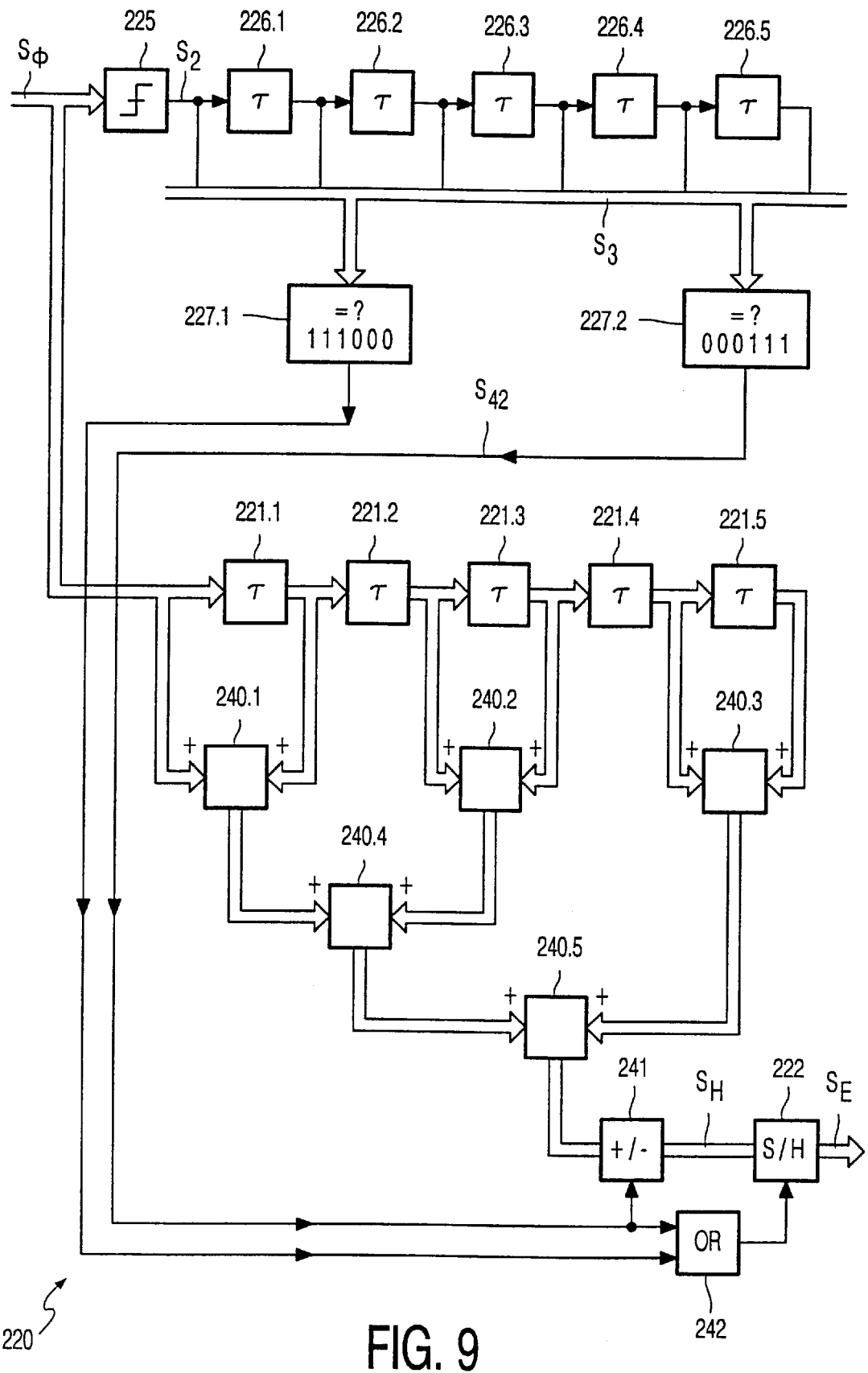
FIG. 9 shows the error signal generating means in a fourth embodiment of the apparatus in accordance with the invention.

FIG. 9 shows the error signal generating means 220 in a fourth embodiment of the apparatus in accordance with the invention. Parts therein which correspond to those of FIG. 3 bear the same reference numerals incremented by 200. Parts which correspond to those of FIG. 5 bear the same reference numerals incremented by 100. As in the embodiment shown in FIG. 5 the signalling means 225, 226.1–226.5, 227.1, 227.2 include first signalling means 227.1 and second signalling means 227.2 for respectively signalling, independently of one another, a negative step and a positive step in the read signal $S_0(t)$. In particular, the first signalling means 227.1 signal a negative step in the read signal $S_0(t)$ when the bit sequence 111000 occurs. The second signalling means 227.1 signal a positive step in the read signal $S_0(t)$ when the bit sequence 000111 occurs. An adder tree 240.1–240.5 determines the sum of values of the read signal $S_0(t)$ which correspond to the bits in the detected bit sequence. With the aid of a controllable inverter 241 an auxiliary signal $S_H(t)$ is generated from the sum calculated by the adder tree. If the signal $S_{42}$ generated by the signalling means 227.2 is "0", the auxiliary signal $S_H(t)$ corresponds to the signal supplied by the adder tree. If the signal $S_{42}$ generated by the signalling means 227.2 is "1", the auxiliary signal $S_H(t)$ is the inverse of the signal supplied by the adder tree. The sample and hold means 222 sample the auxiliary signal $S_H(t)$ if one of the control signals $S_{41}$, $S_{42}$ is 1.

It is obvious that to those skilled in the art many variants are conceivable without departing from the scope defined by the claims. In another embodiment the apparatus is for example intended for reading and/or inscribing an optical data carrier in the form of a tape.

The invention further relates to any new characteristic feature and any new combination of characteristic features.

What is claimed is:

1. An apparatus for reading an optical data carrier (1), comprising:

a transducer (5) for optically reading an optically readable pattern recorded in substantially parallel data tracks of the data carrier, and for generating a read signal ($S_O(t)$) which is an indication of the optically readable pattern, means for causing a relative movement of the transducer (5) with respect to the data carrier (1), correction means (16, 17, 18) for reducing tangential tilt ($I_T$), and error signal generating means (20) for generating an error signal ($S_E(t)$) for the correction means, characterized in that the error signal generating means (20) is adapted to derive the error signal ($S_E(t)$) from a temporal asymmetry of the response of the read signal ($S_O(t)$) to the optically readable pattern.

2. An apparatus as claimed in claim 1, further characterized by channel decoding means and/or error correction means.

3. An apparatus as claimed in claim 1, characterized in that the signalling means (125, 126.1–126.8, 127.1, 127.2) signal a negative step in the read signal ($S_O(t)$) upon the occurrence of a bit sequence which successively comprises a bit of the value 0, n bits of the value 1, n bits of the value 0 and one bit of the value 1, and signal a positive step in the read signal ($S_O(t)$) upon the occurrence of a bit sequence which successively comprises one bit of the value 1, n bits of the value 0, n bits of the value 1 and one bit of the value 0.

4. An apparatus as claimed in claim 5, characterized in that n is 3.

5. An apparatus as claimed in claim 1, further characterized by means for generating a further error signal which is a measure of radial tilt.

6. An apparatus as claimed in claim 1, for reading and/or writing as optically readable data carrier, comprising a transducer (5) for optically recording an optically readable pattern in substantially parallel data tracks of the data carrier in response to a write signal.

7. A method of reading an optical data carrier (1), in which method a transducer (5) reads an optical pattern recorded in substantially parallel data tracks of the data carrier, and in which a read signal ($S_O(t)$) is generated which is an indication of the optically readable pattern, in which the transducer (5) is moved relative to the data carrier (1), in which correction means (16, 17, 18) reduces tangential tilt ($I_T$), and in which error signal generating means (20) generates an error signal ($S_E(t)$) for the correction means, characterized in that the error signal generating means (20) derives the error signal ($S_E(t)$) from a temporal asymmetry of the response of the read signal ($S_O(t)$) to the optically readable pattern.

8. An apparatus for reading an optical data carrier (1), comprising:

a transducer (5) for optically reading an optically readable pattern recorded in substantially parallel data tracks of the data carrier, and for generating a read signal ($S_O(t)$) which is an indication of the optically readable pattern, means for causing a relative movement of the transducer (5) with respect to the data carrier (1), correction means (16, 17, 18) for reducing tangential tilt ($I_T$), and error signal generating means (20) for generating an error signal ($S_E(t)$) for the correction means, characterized in that the error signal generating means (20) is adapted to derive the error signal ($S_E(t)$) from a temporal asymmetry of the response of the read signal ($S_O(t)$) to the optically readable pattern, and includes:

auxiliary signal generating means (21, 22, 23) for generating a multivalent auxiliary signal ($S_H(t)$) from the read signal, comprising delay means (21, 22), sample and hold means (24) for sampling a value of the auxiliary signal ($S_H(t)$) and storing the sampled value, and signalling means (25, 26.1–26.10) for generating a control signal ($S_4(t)$) for the sample and hold means (24) when a step in the read signal ($S_O(t)$) is signalled.

9. An apparatus as claimed in claim 8, characterized in that the signalling means (125, 126.1–126.8, 127.1, 127.2) includes first signalling means (127.1) and second signalling means (127.2) respectively for signalling a negative step and a positive step in the read signal ($S_O(t)$) independently of one another.

10. An apparatus as claimed in claim 8, further characterized by channel decoding means and/or error correction means.

11. An apparatus as claimed in claim 8, characterized in that the signalling means (125, 126.1–126.8, 127.1, 127.2) signal a negative step in the read signal ($S_O(t)$) upon the occurrence of a bit sequence which successively comprises one bit of the value 0, n bits of the value 1, n bits of the value 0 and one bit of the value 1, and signals a positive step in the read signal ($S_O(t)$) upon the occurrence of a bit sequence which successively comprises one bit of the value 1, n bits of the value 0, n bits of the value 1 and one bit of the value 0.

12. An apparatus as claimed in claim 8, characterized in that n is 3.

13. An apparatus as claimed in claim 8, further characterized by means for generating a further error signal which is a measure of radial tilt.

14. An apparatus as claimed in claim 8, for reading and/or writing an optically readable data carrier, comprising a transducer (5) for optically recording an optically readable pattern in substantially parallel data tracks of the data carrier in response to a write signal.

* * * * *